United States Patent
Chang et al.

(10) Patent No.: US 9,223,180 B2
(45) Date of Patent: Dec. 29, 2015

(54) FRINGE FIELD SWITCHING MODE LIQUID CRYSTAL DISPLAY PANEL

(71) Applicant: AU Optronics Corporation, Hsin-Chu (TW)

(72) Inventors: Wan-Heng Chang, Hsin-Chu (TW); Hsiao-Wei Cheng, Hsin-Chu (TW); Shih-Chyuan Fan Jiang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 356 days.

(21) Appl. No.: 13/798,607

(22) Filed: Mar. 13, 2013

(65) Prior Publication Data
US 2014/0085582 A1 Mar. 27, 2014

(30) Foreign Application Priority Data

Sep. 24, 2012 (TW) ............................... 101134959 A

(51) Int. Cl.
*G02F 1/1343* (2006.01)
(52) U.S. Cl.
CPC .... *G02F 1/134309* (2013.01); *G02F 1/134363* (2013.01); *G02F 2001/134372* (2013.01); *G02F 2201/121* (2013.01)
(58) Field of Classification Search
CPC ................... G02F 1/134309; G02F 1/134363; G02F 2001/134372; G02F 2201/121
USPC ............................................. 349/141; 3/141
See application file for complete search history.

(56) References Cited

U.S. PATENT DOCUMENTS

| | | | |
|---|---|---|---|
| 6,233,034 B1 * | 5/2001 | Lee et al. | 349/141 |
| 6,449,026 B1 * | 9/2002 | Min et al. | 349/141 |
| 6,678,027 B2 | 1/2004 | Park et al. | |
| 7,405,796 B2 | 7/2008 | Lu et al. | |
| 7,489,380 B2 * | 2/2009 | Lim et al. | 349/141 |
| 7,982,839 B2 | 7/2011 | Choi et al. | |
| 8,134,674 B2 | 3/2012 | Lim et al. | |
| 2001/0005251 A1 * | 6/2001 | Kim et al. | 349/141 |
| 2008/0186440 A1 | 8/2008 | Lim et al. | |
| 2010/0245725 A1 * | 9/2010 | Kaihoko et al. | 349/96 |

FOREIGN PATENT DOCUMENTS

| | | |
|---|---|---|
| CN | 101241278 | 8/2008 |
| JP | 2008203674 | 9/2008 |
| TW | I293133 | 2/2008 |

* cited by examiner

*Primary Examiner* — Hoan C Nguyen
(74) *Attorney, Agent, or Firm* — WPAT, PC; Justin King

(57) ABSTRACT

A Fringe-Field Switching (FFS) mode liquid crystal display (LCD) panel with optimized designs of pixel areas and/or liquid crystal materials is provided. The FFS mode LCD panel includes an active-element array substrate with a plurality of pixel areas, an opposite substrate, and a liquid crystal layer. Each pixel area comprises a plurality of first common electrodes, a second common electrode between the pixel area and another horizontally adjacent pixel area, and a pixel electrode. The optical transmittance and homogeneity of the pixel area of the display panel are modified by manipulating the relative position of the electrodes in the pixel areas on the active-element array substrate and/or adopting specific parameters of liquid crystal materials in the liquid crystal layer of the display panel.

7 Claims, 8 Drawing Sheets

FRINGE FIELD SWITCHING MODE LIQUID CRYSTAL DISPLAY PANEL

RELATED APPLICATIONS

This application claims priority to Taiwan Application Serial Number 101134959, filed Sep. 24, 2012, which is herein incorporated by reference.

BACKGROUND

1. Technical Field

The present disclosure relates to a liquid crystal display (LCD) panel, and more particularly, to a Fringe-filed switching (FFS) mode LCD panel.

2. Description of Related Art

In recent years, LCD panels have been widely used in electrical devices including home appliances. In general, an LCD panel includes one pair of substrates formed with electrodes on their surfaces, and a liquid crystal layer sandwiched between the pair of substrates. By applying an external voltage to the electrodes on both substrates to form an electric field across the liquid crystal layer, the alignment of liquid crystal molecules is affected and thus rearranged, so as to change the optical transmittance of the liquid crystal layer and to display images. However, since the alignment of liquid crystal molecules in the liquid crystal layer is affected by many factors, such as deviation in position and/or shape of the electrodes and variation in manufacturing process, these factors will cause the undesired alignment of the liquid crystal molecules, reducing the optical transmittance of the LCD panel and deteriorating the display quality of the LCD panel.

SUMMARY

One aspect of the present disclosure provides a fringe-field switching (FFS) mode liquid crystal display (LCD) panel. The FFS mode LCD panel comprises a first substrate, a second substrate, and a liquid crystal layer disposed between the first substrate and the second substrate. At least one scan line is disposed on the first substrate. At least one data line is disposed on the first substrate, and the data line crosses the scan line to define at least one pixel area, and each pixel area is constructed by at least one scan line and at least one data line crossed to the scan line. At least one switch is disposed in the pixel area to electrically connect to the scan line, the data line, and at least one pixel electrode respectively, wherein the pixel electrode is disposed in the pixel area. And at least one transparent common electrode is disposed on the pixel area of the first substrate, and the transparent common electrode is separated from the pixel electrode by a insulating layer, wherein the common electrode at least comprises a plurality of first common electrode and at least one second common electrode, the second common electrode is disposed above the data line and covering the data line, and the first common electrodes are disposed in the pixel area where there is a space between every two adjacent first common electrodes, wherein the projection distance on the first substrate between the edge of the pixel electrode of the pixel area and the edge of the first common electrode, which is nearest to the second common electrode, is d1, the projection distance on the first substrate between the edge of the second common electrode and the edge of the pixel electrode of the pixel area is d2.

In one embodiment of the present disclosure, the range of the value of aforementioned d1, d2, and sum of (d1+d2) are controlled to reduce the loss of the optical transmittance, which is caused by process variation of lithography-etching, and improve the uniformity within pixel area of the optical transmittance. The yield of The FFS mode LCD panel of the present disclosure is improved.

Another aspect of the present disclosure provides fringe-field switching (FFS) mode liquid crystal display (LCD) panel. The FFS mode LCD panel comprises a first substrate, a second substrate, and a liquid crystal layer disposed between the first substrate and the second substrate. At least one scan line is disposed on the first substrate. At least one data line is disposed on the first substrate, and is crossing the scan line to define at least one pixel area. At least one switch is disposed in the pixel area to electrically connect to the scan line, the data line, and at least one pixel electrode respectively. And at least one common electrode is disposed on the pixel area of the first substrate, and is separated from the pixel electrode by a insulating layer, wherein the common electrode at least comprises a plurality of first common electrode and at least one second common electrode, the second common electrode is disposed above the data line and covering the data line, and the first common electrodes are disposed in the pixel area where there is a space between every two adjacent first common electrodes, wherein the liquid crystal layer has a predetermined thickness (D) and a liquid crystal materials, wherein and the product of the predetermined thickness (D) of the liquid crystal layer and the birefringence ($\Delta n$) of the liquid crystal materials of the liquid crystal layer ($\Delta n*D$). The Liquid crystal material of the liquid crystal layer has positive dielectric anisotropy ($\Delta \in$).

In one embodiment of the present disclosure, the range of the value of aforementioned d1, d2, and sum of (d1+d2) are controlled to reduce the loss in the optical transmittance, which is caused by process variation of lithography-etching, and to improve the uniformity within pixel area of the optical transmittance. The yield of The FFS mode LCD panel of the present disclosure is improved.

BRIEF DESCRIPTION OF THE DRAWINGS

The disclosure may be more fully understood by reading the following detailed description of the embodiment, with reference made to the accompanying drawings as follows.

DETAILED DESCRIPTION

Figure 1:
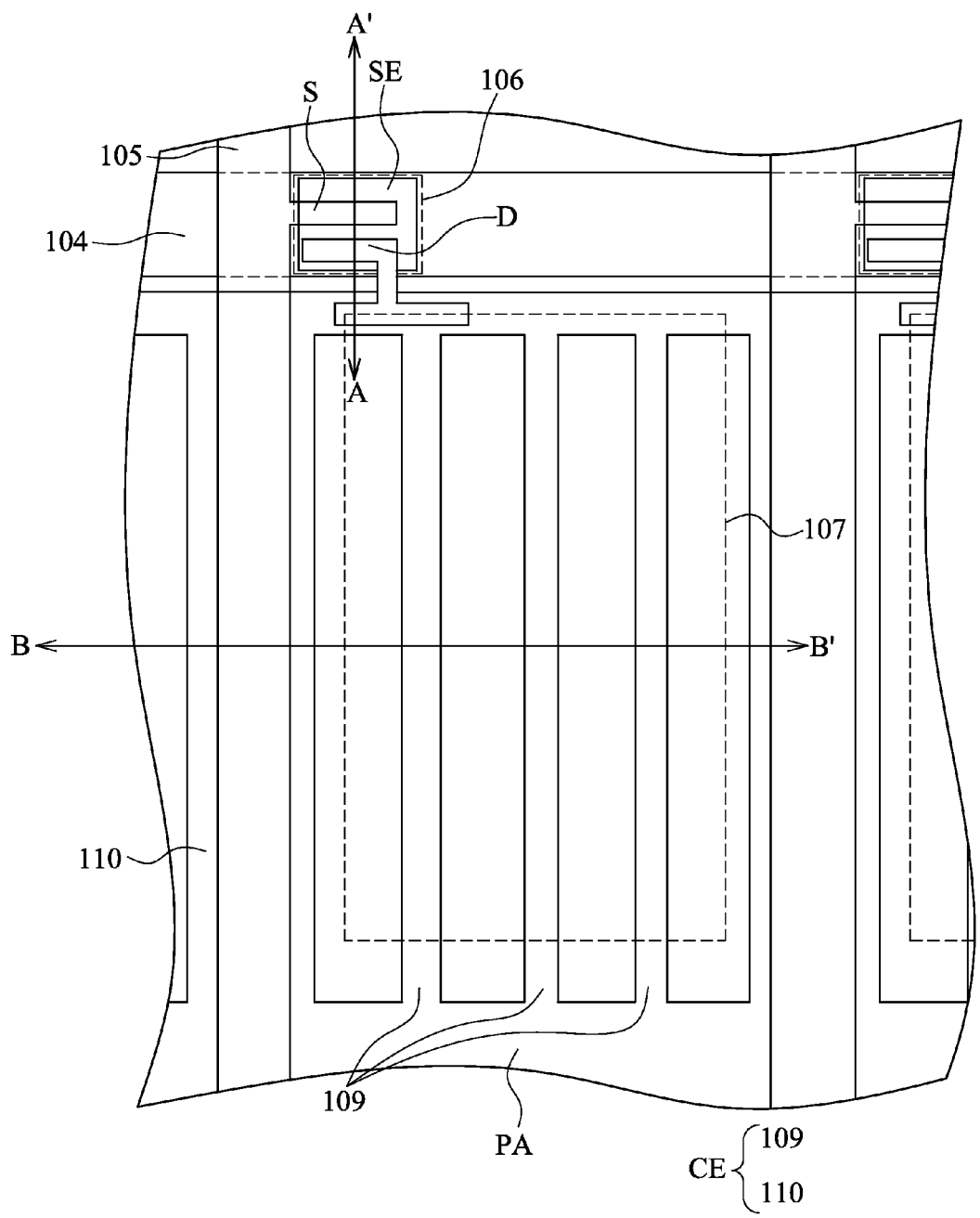
FIG. 1 is the partial top-view of the pixel area according to another embodiment of the present disclosure.

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

As used herein, the singular forms "a," "an" and "the" include plural referents unless the context clearly dictates otherwise. Therefore, reference to, for example, a data sequence includes aspects having two or more such sequences, unless the context clearly indicates otherwise.

Reference will now be made in detail to the embodiments of the present disclosure, examples of which are illustrated in the accompanying drawings. Wherever possible, the same reference numbers are used in the drawings and the description to refer to the same or like parts.

According to an embodiment of the present disclosure, a FFS mode LCD panel of top common design is provided. The FFS mode LCD panel of top common design is a LCD panel that its common electrodes are fabricated above its data lines and pixel electrodes. The FFS mode LCD panel of the present disclosure comprises a first substrate, a second substrate, and a liquid crystal layer disposed between the first and the second substrates. The first substrate has at least one pixel area, and the pixel area comprises at least one common electrode and at least one pixel electrode. When fabricating aforementioned electrodes, even inevitable process variations occur (such as errors of lithography and/or etching process) and produce deviation of the spacing and/or the width of the electrodes from the original design, the FFS mode LCD panel of the present disclosure still keeps good optical transmittance and homogeneity of different sites within the pixel area. That is, the FFS mode LCD panel of the present disclosure has better tolerance on process variations, extends the margin of lithography and/or etching process. Therefore, the yield of fabricating the FFS mode LCD panel of the present disclosure is effectively improved.

Figure 1A:
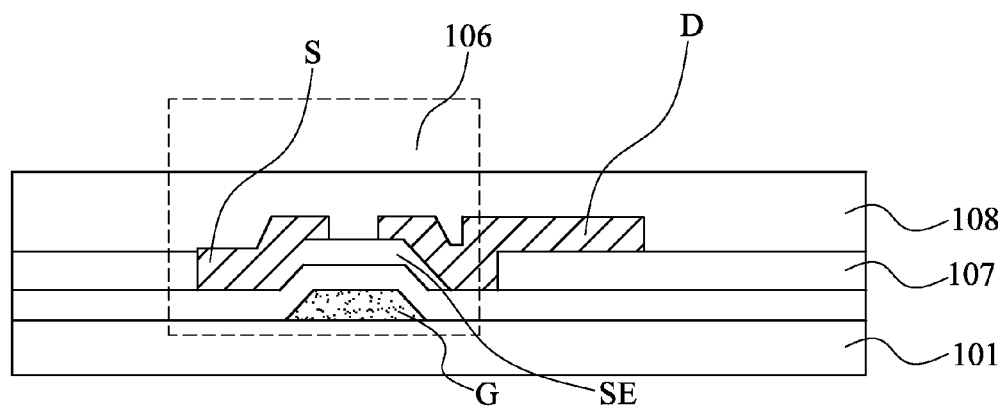
FIG. 1A is the cross-section of the pixel area on the first substrate (along the line AA' in FIG. 1) according to another embodiment of the present disclosure.
Figure 1B:
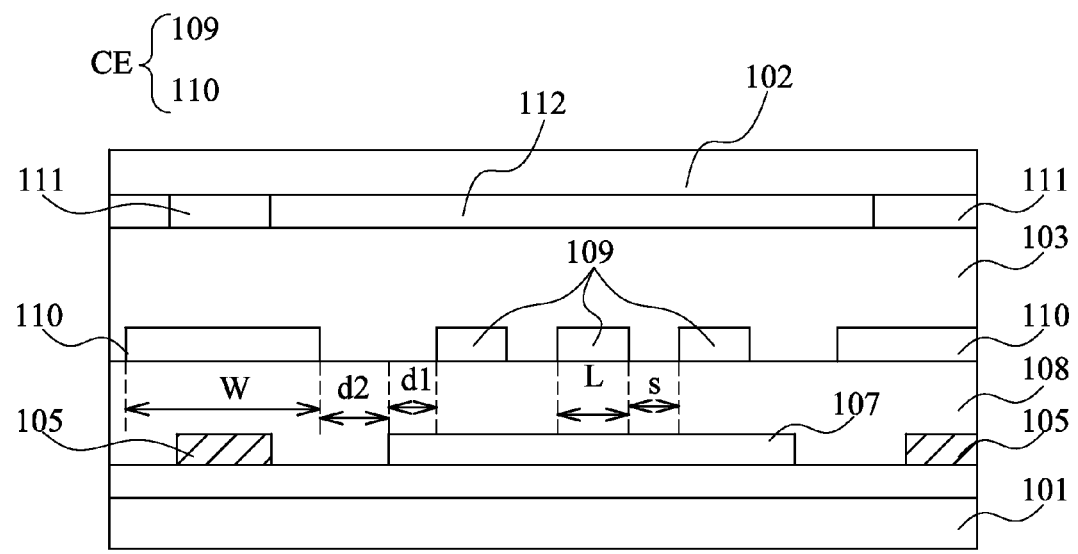
FIG. 1B is another cross-section of the pixel area of the FFS mode LCD panel (along with the BB' line in FIG. 1) according to another embodiment of the present disclosure.

In order to extend the margin of the process fabricating a FFS mode LCD panel and increase the yield, the embodiment of the present disclosure has a special design of the relative positions of the electrodes on the active-element array substrate (first substrate). Referring to FIG. 1, FIG. 1A, and FIG. 1B. FIG. 1 illustrates a partial top view of the pixel area, FIG. 1A illustrates the cross-section of the pixel area on the first substrate (along the line AA' in FIG. 1), and FIG. 1B illustrates another cross-section of the pixel area of the FFS mode LCD panel (along the BB' line in FIG. 1). According to this embodiment, at least one scan line 104 is disposed on the first substrate 101. And at least one data line 105 is also disposed on the first substrate 101, the data line 105 and the scan line 104 are crossed each other to define at least one pixel areas PA. The following description is based on one pixel area PA as the example of the present disclosure, but not limited to it. At least one switch 106 disposed in the pixel area PA, the switch 106 is electrically connected to the scan line 104, the data line 105, and at least one pixel electrode 107, respectively. Switch 106 is a transistor which is constructed by a gate G, a semiconductor layer SE, a source S, and a drain D, wherein an insulating layer (not labeled) is disposed between the gate G and the semiconductor layer SE, as shown in FIG. 1A. Therefore, the gate G of switch 106 is connected to the scan line 104, the source S of switch 106 is connected to the data line 105, and the drain D of switch 106 is connected to the pixel electrode 107. The type of the transistor can be top-gate transistor, bottom-gate transistor, or other suitable transistors, and materials of the semiconductor layer SE can be an amorphous semiconductor, a polycrystalline semiconductor, a single crystal semiconductor, a microcrystalline semiconductor, nano-crystal semiconductor, an oxide semiconductor, an organic semiconductor, a quantum dot semiconductor, or other suitable materials, or a combination thereof. The pixel electrode 107 is disposed in the pixel area PA, as shown in FIG. 1 and FIG. 1B. At least one common electrode CE is disposed on the pixel area PA of the first substrate 101, and the common electrode CE is separated from the pixel electrode 107 by an insulating layer 108 between the pixel electrode 107 and the common electrode CE. In other words, the common electrode CE is not contacted with the pixel electrode 107. As shown in FIG. 1 and FIG. 1B, it is optional to add isolation layer (not labeled) between the first substrate 101 and three device, wherein the three devices has the pixel electrode 107, the data line 105, and/or the insulating layer 108.

In one embodiment of the present disclosure, as shown in FIG. 1B, the common electrode CE at least comprises a plurality of first common electrodes 109 and at least one second common electrode 110. The second common electrode 110 is disposed and covering the data line 105 and every two adjacent first common electrode 109 has a space S. In other words, there is a space S existed between every two adjacent first common electrodes. Each first common electrode 109 has a width L, and is disposed in the pixel area PA. The projection distance on the first substrate 101 between the edge of the pixel electrode 107 of the pixel area PA and the edge of the first common electrode 109, which is nearest to the second common electrode 110 or means the most outside of the first common electrode 109, is d1. The projection distance on the first substrate 101 between the edge of the second common electrode 110 and the edge of the pixel electrode 107 of the pixel area PA is d2. The space S is substantially greater than 0.

In one embodiment of the present disclosure, as shown in FIG. 1B, the second common electrode 110 has a width W, the width W of the second common electrode 110 is substantially greater than width L of each the first common electrode 109. Besides, as an example of the present disclosure, a terminal of the second common electrode 110 is connected to a terminal of each first common electrode 109 by a connecting portion (not labeled) in FIG. 1B, however, the second common electrode 110 is not necessary to be connected to the first common electrode 109 in other embodiments of the present disclosure. The first common electrodes 109, the second common electrode 110, the data line 105, the scan line 104, and the space S of the present disclosure are illustrated in a strip shape, however, in other embodiments, at least one of them can be in a curve, zigzag, polygons, or other suitable shape.

Furthermore, the liquid crystal layer 103 is disposed between the first substrate 101 and the second substrate 102 when a LCD panel is made. To let the LCD panel can display color screen, a plurality of color filter layer 112 is disposed between the first substrate 101 and the second substrate 102. In the following embodiments of the present disclosure, the color filter layer 112 is disposed between the second substrate 102 and the liquid crystal layer 103, that is, the color filter layer 112 disposed on the second substrate 102 as the examples, however, in other embodiments, the color filter layer 112 may also be disposed in between the first substrate 101 with a liquid crystal layer 103, that is, the color filter layer 112 may be disposed on the first substrate 101, such as the color filter layer 112 is disposed under the switch 106 (array on color filter, AOC), or the color filter layer 112 is disposed above the switch 106 (color filter on array, COA). In addition, in order to avoid the color from the color filter layers 112 blending, a black matrix 111 is usually applied between any two adjacent color filter layers 112. In general, black matrix 111 is disposed on corresponding signal line, such as data line 105 (as shown in FIG. 1B or FIG. 1) and/or scan line 104 (as shown in FIG. 1).

In production process of LCD panel, however, the original design of pixel area of a LCD panel is often deviated because of some inevitable process variations, such as alignment, exposure, and etching errors during lithography-etching process, those inevitable process variations will produce offsets of electrode positions and deviated widths of the electrodes. Those errors will happen during the manufacturing of the active-element array substrate of a FFS mode LCD panel, and result in a bad uniformity within the active-element array substrate of electrode positions and electrode widths of all pixel areas. Those errors also result in errors with the original design spacing distance between the electrodes, and then the manufactured FFS mode LCD panels suffer bad uniformity and the optical transmittance loss issue. Usually the optical transmittance means the transmittance of light; the optical transmittance is used in accordance with the usual formula and the light transmittance of visible wavelengths of light sources.

Embodiment 1

The electrode design of the pixel area PA, the film-stacking structure, d1, and d2 are defined the same as above-mentioned, only the reference numeral of them are different from above, such as common electrode CE, first common electrode 309, second common electrode 310, pixel electrode 307, data line 305, and insulating layer 308. In Example 1 of the present disclosure, d1 is substantially 4 micrometers (μm), and d2 is substantially 2 μm. Example 2 of the present disclosure is a simulation of Example 1 suffered the process variations aforementioned. In Example 2 of the present disclosure, d1 is substantially 2.45 μm, and d2 is also substantially 2.45 μm. Wherein the definition of d1 and d2 is the same as above, such as the projection distance on the first substrate 101 between the edge of the pixel electrode 307 and the edge of the first electrode 309, which is nearest to the second common electrode 310, is d1. The projection distance on the first substrate 101 between the edge of the second common electrode 310 and the edge of the pixel electrode 307 of the pixel area PA is d2. The electrode spacing parameters of Examples 1 and 2 are shown in Table 1:

TABLE 1

The electrode spacing parameters of Examples 1 (Normal) and Example 2 (process varied)

|  | d1 (μm) | d2 (μm) |
| --- | --- | --- |
| Example 1 | 4 | 2 |
| Example 2 | 2.45 | 2.45 |

Figure 2:
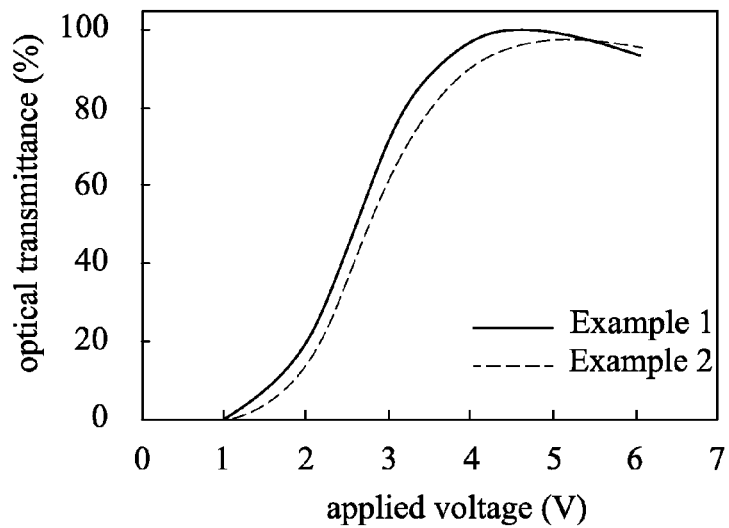
FIG. 2 is the optical transmittance measurement results of Example 1 and Example 2 of the present disclosure.
Figure 3:
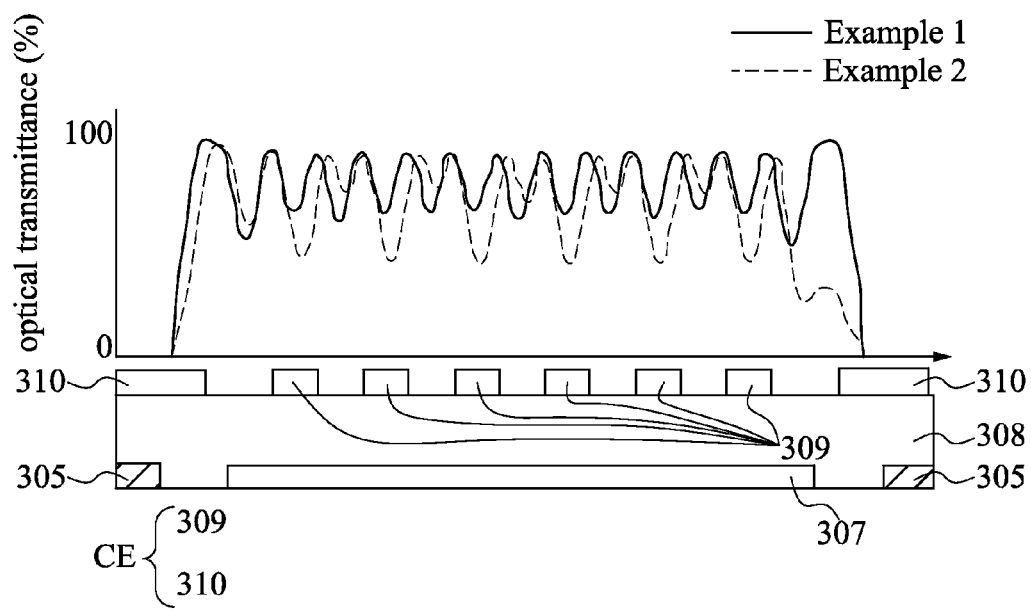
FIG. 3 is the results of the transmittance uniformity (within one pixel area) of Example 1 and Example 2 of the present disclosure.

The loss of optical transmittance and transmittance uniformity deterioration phenomenon described above is explained by measured data of the Example 1 and Example 2 of the present disclosure. Referring to FIG. 2 and FIG. 3, FIG. 2 is the optical (light) transmittance measurement results of Example 1 and Example 2, and FIG. 3 is the results of the transmittance uniformity measurements of Example 1 and Example 2. The electrode spacing parameters of Example 1 and Example 2 are different, but Example 1 and Example 2 adopt the same liquid crystal material, and their thickness of the liquid crystal layer are also the same (for example, both Example 1 and Example 2 adopt a liquid crystal material with positive type dielectric anisotropy ($\Delta\in$ is substantially 7), birefringence ($\Delta n$ is substantially 0.1), and their thickness of the liquid crystal layer (D) is substantially 3.40 (μm). Example 1 is the normal LCD panel that its d1 is substantially 4 μm, and its d2 is substantially 2 μm. However, with lithography-etching process variation, the positions and the widths of the first common electrodes 309, the second common electrode 310, and pixel electrode 307 are changed, lead to the formation of Example 2. Example 2 is the process variation impacted LCD panel that its d1 from about 4 um becomes substantially 2.45 μm, and its d2 from about 2 um becomes substantially 2.45 μm. That is, in the following optical transmittance comparison of Example 1 and Example 2 of the present disclosure, d1 and d2 are the most important and the only factors (the dependent variables). Other factors (for example: liquid crystal materials, thickness of the liquid crystal layer) are not considered into the influence of the optical transmittance since they are control variables. Regarding the detail of the positive-type dielectric anisotropy ($\Delta\in$), referring to the following paragraphs of Embodiment 2.

In FIG. 2 (the relationship between the optical transmittance (%) and the applied voltage, V), curve of Example 1 represents the display panel which is not suffered the process variations, and the electrode distances of the display panel of Example 1, d1 and d2, are in accordance with a predetermined design; curve of Example 2 represents the display panel which is suffered the process variations, and the electrode distances of the display panel of Example 2, d1 and d2, are different from the predetermined design. As shown in FIG. 2, comparing to the normal LCD panel (Example 1), the LCD panel suffered process variations (Example 2) has worse performance of the optical transmittance (%) in the same applied voltage (V).

Referring to FIG. 3, FIG. 3 is the cross-sectional view of the optical transmittance (%) within a single pixel area PA in horizontal direction (as the BB' sectional line of FIG. 1); curve of Example 1 represents the display panel which is not suffered the process variations, and the electrode distances of the display panel of Example 1, d1 and d2, are in accordance with a predetermined design; curve of Example 2 represents the display panel which is suffered the process variations, and the electrode distances of the display panel of Example 2, d1 and d2, are different from the predetermined design. As shown in FIG. 3, at the same applied voltage, both LCD panels of Example 1 and Example 2 have the intensity distribution of the electric field generated by each of the electrodes in the pixel area PA. The intensity distribution causes different rotating directions of the liquid crystal molecules in the horizontal direction in the pixel area PA, so as to generate non-uniform optical transmittances in different positions of the LCD panel, especially in the edge of the pixel area PA, that is, between the pixel area PA horizontally adjacent the another pixel area PA of the non-uniform optical transmittances is most obvious. As shown in FIG. 3, the LCD panel suffered process variations (Example 2) has worse performance of the optical transmittance (%) in the same applied voltage, simultaneously the uniformity of optical transmittances within a LCD panel are also worsened.

To above-described phenomenon, the design parameters of distances between electrodes are aimed, and three different sums of electrode spacing (or namely total distances, or total length) are selected in the present disclosure. The three different total distances (d1+d2) selected is substantially 5 μm, 6 μm, and 7 μm respectively. In the design of the same total distances, further produce the LCD panels with different distances ratio (d1/d2), for example: in the total distances (d1+d2) is substantially 5 μm, further produce the LCD panel with d1 consists substantially 1 μm to 5 μm (corresponding d2 is substantially 4 μm to 0 μm). Then all combinations of designs are selected to produce the LCD panels suffered the same degree of process variation respectively, and the actual measurement data of the respective optical transmittance of the LCD panels are also collected respectively. The data are summarized as follows in Table 2 and shown in FIG. 4.

TABLE 2

The optical transmittance loss data caused by the same degree of process variation in different predetermined design of spacing between electrodes

| total distances (d1 + d2) | predetermined design of spacing between electrodes | | The optical transmittance loss data caused by the same degree of process variation |
|---|---|---|---|
| (μm) | d1 (μm) | d2 (μm) | (%) |
| 5 | 1 | 4 | 17.00 |
|   | 2 | 3 | 16.00 |
|   | 3 | 2 | 10.00 |
|   | 4 | 1 | 6.00 |
|   | 5 | 0 | 5.00 |
| 6 | 2 | 4 | 17.00 |
|   | 3 | 3 | 13.00 |
|   | 4 | 2 | 8.60 |
|   | 5 | 1 | 5.00 |
|   | 6 | 0 | 4.00 |
| 7 | 2 | 5 | 15.00 |
|   | 4 | 3 | 11.00 |
|   | 5 | 2 | 6.00 |
|   | 6 | 1 | 1.25 |
|   | 7 | 0 | 1.09 |

Comparing to the LCD panels with predetermined electrode spacing, each the LCD panels suffered the same degree of process variations has electric field intensity distribution deviated from their predetermined design respectively, so as to resulting in the loss of the optical transmittance, however, when facing the same degree of process variation, the extent of loss of the optical transmittance of different designs is different from each other.

Figure 4:
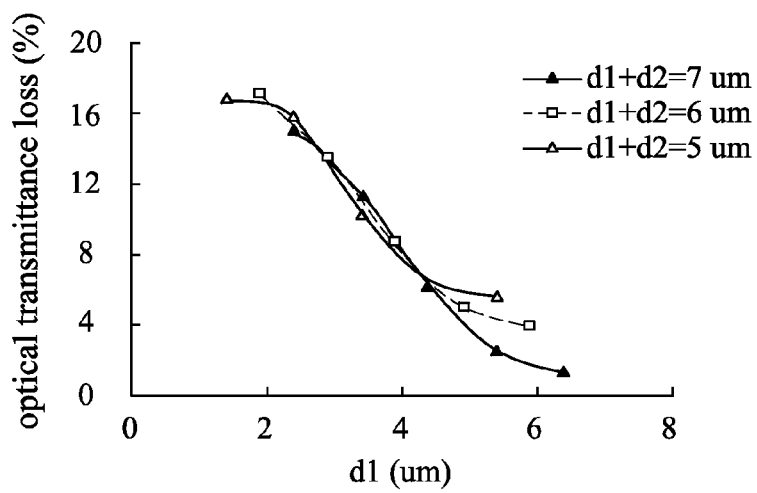
FIG. 4 is the results of optical transmittance loss in different parameters of electrode spacing of the present disclosure.

As different designs listed in Table 2 and their results shown in FIG. 4, the three different total distances ((d1+d2 or d1 plus d2) is substantially 5 μm, 6 μm, and 7 μm), with d1 increases (as d2 decreases), the optical transmittance losses circumstances can be gradually improved.

Wherein, it can be seen within the two sets of data (sum of (d1+d2) is substantially 5 μm, 6 μm in Table 2), when d1 is substantially equal or greater than d2, especially d1 is substantially greater than d2, the optical transmittance loss caused by process variation can be significantly improved. For example, when the total distances of the electrode spacing (d1+d2) is substantially 5 μm and d1 is substantially 3 μm (as d2 is substantially 2 μm), the optical transmittance loss caused by process variation is substantially only 10.00%, compared to the total length of the electrode spacing (d1+d2) is also substantially 5 μm and d1 is substantially 2 μm (as d2 is substantially 3 μm), the optical transmittance loss caused by process variation is substantially 16.00%. It shows that the design of d1 is substantially equal or greater than d2, especially d1 is substantially greater than d2, can significantly improve the loss of optical transmittance caused by the same degree of process variation.

Furthermore, when 0 μm≤d2≤2 μm, means d2 ranges from about 0 μm to 2 μm or namely d2 is substantially equal or greater than 0 μm and is substantially equal or greater than 2 μm, the loss of optical transmittance caused by the same degree of process variation is improved significantly within the three groups of total length of the electrode spacing ((d1+d2) is substantially 5 μm, 6 μm, 7 μm). For example, within the group of the total distances of the electrode spacing (d1+d2) substantially 5 μm, the optical transmittance loss of the LCD panel with d2 substantially 2 μm compared to that of the LCD panel d2 substantially 3 μm, the optical transmittance loss is substantially improved from 16.00% to 10.00%. It can be also seen the other two groups of the total distances of the electrode spacing (d1+d2) substantially 6 μm and 7 μm. For example, within the group of the total distances of the electrode spacing (d1+d2) substantially 6 μm, the optical transmittance loss of the LCD panel with d2 substantially 2 μm compared to that of the LCD panel d2 substantially 3 μm, the optical transmittance loss is substantially improved from 13.00% to 8.6%; within the group of the total distances of the electrode spacing (d1+d2) substantially 7 μm, the optical transmittance loss of the LCD panel with d2 substantially 2 μm compared to that of the LCD panel d2 substantially 3 μm, the optical transmittance loss is substantially improved from 11.00% to 6.00%. Preferably, within the group of the total distances of the electrode spacing (d1+d2) substantially 7 μm, when d2 is substantially equal to zero μm (0 μm), the optical transmittance loss substantially improved from 11.00% to 1.09%. Second-preferably, within the group of the total distances of the electrode spacing (d1+d2) substantially 7 μm, when d2 is substantially 1 μm, the optical transmittance loss substantially improved from 11.00% to 1.25%.

Furthermore, select the LCD panel of the total distances of the electrode spacing (d1+d2) substantially 7 μm, and d2 substantially 1 μm as Example 3. It should be noticed that the optical transmittance loss of Example 3 is substantially 1.09% (referring to last row of total distances (d1+d2) 7 μm in Table 2 and the data shown in FIG. 4). By the same degree of process variation from above Example 1 to Example 2, produce the LCD panel, Example 4, from Example 3. The electrode spacing parameters of Examples 3 and 4 are summarized and shown in Table 3, wherein Example 1, 3 is the baseline of their LCD panel suffered process variation, Example 2, 4, respectively. Therefore, the optical transmittance losses of Example 1, 3 are defined as 0 respectively.

In other words, Example 1 in Table 3 is the LCD panel with predetermined electrode spacing design without suffering process variation (d1 substantially 4 μm, d2 substantially 2 μm), and its Δ∈ is substantially 7, Δn*D (product of Δn and D or multiplication of Δn and D) is substantially 340 nanometers (nm); Example 2 in Table 3 is the LCD panel suffered process variation with deviated electrode spacing (d1 substantially 2.45 μm, d2 substantially 2.45 μm), and its Δ∈ is substantially 7, Δn*D is substantially 340 nm; Example 3 in Table 3 is the LCD panel with predetermined electrode spacing design without suffering process variation (d1 substantially 7 μm, d2 substantially 0 μm), and its Δ∈ is substantially 7, Δn*D is substantially 340 nm; and Example 4 in Table 3 is the LCD panel suffered process variation with deviated electrode spacing (d1 substantially 5.45 μm, d2 substantially 0.45 μm), and its Δ∈ is substantially 7, Δn*D is substantially 340 nm

TABLE 3

The optical transmittance loss data caused by the same degree of process variation in different predetermined design of spacing between electrodes

|  | d1 (μm) | d2 (μm) | d1 + d2 (μm) | The optical transmittance loss data caused by the same degree of process variation (%) |
|---|---|---|---|---|
| Example 1 | 4 | 2 | 6 | 0 |
| Example 2 | 2.45 | 2.45 | 4.9 | 8.60 |
| Example 3 | 7 | 0 | 7 | 0 |
| Example 4 | 5.45 | 0.45 | 5.9 | 1.09 |

Figure 5:
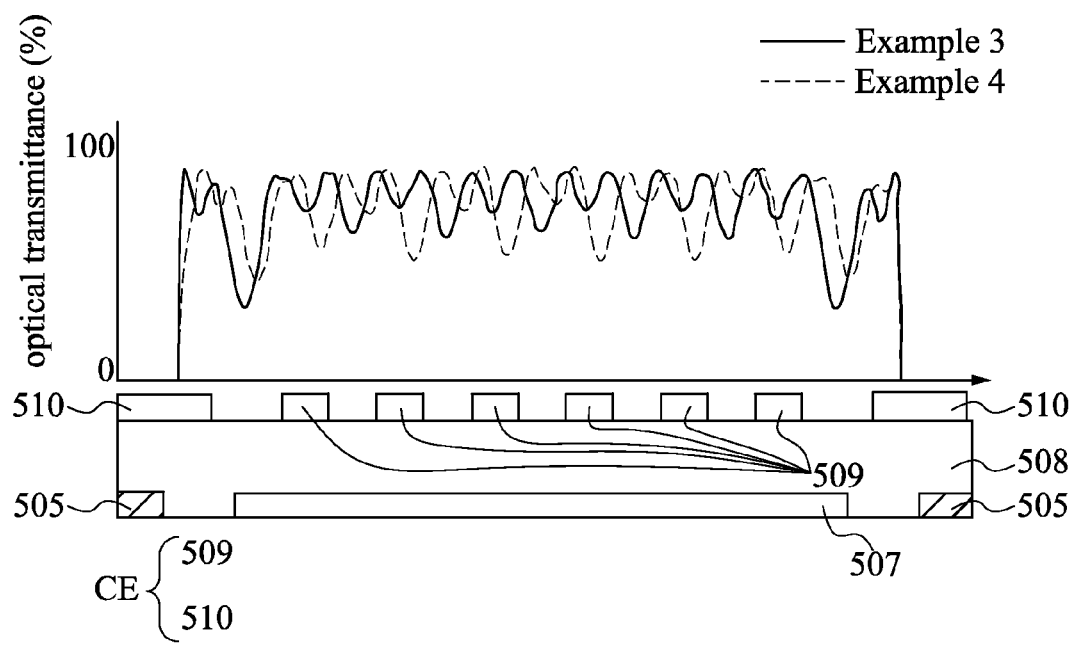
FIG. 5 is the results of the transmittance uniformity (within one pixel area) of Example 3 and Example 4 of the present disclosure.

As shown in Table 3, the optical transmittance loss of Example 3 of the present disclosure has been significantly decreased comparing to that of Example 1. Under the same degree of process variation occurred to Example 1 and Example 3, the optical transmittance loss of Example 2 (compared to its original design Example 1) is about 8.6%, but that of Example 4 (compared to its original design Example 3) is only about 1.09%. The optical transmittance loss decreases substantially from 8.6% to 1.09% by changing the design of the spacing between electrodes. Therefore, the different design of the spacing between electrodes of the LCD panels would lead to different performance of optical transmittance loss when suffered the same degree of process variation. In addition, as shown in FIG. 5, FIG. 5 is the cross-sectional view of the optical transmittance (%) within a single pixel area PA in horizontal direction (as the BB' sectional line of FIG. 1); curve of Example 3 represents the display panel which is not suffered the process variations, and the electrode distances of the display panel of Example 3, d1 and d2, are in accordance with a predetermined design; curve of Example 4 represents the display panel which is suffered the process variations, and the electrode distances of the display panel of Example 4, d1 and d2, are different from the predetermined design. These two curves in the loss of the average optical transmittance and optical transmittance loss at different locations (uniformity) have no significant differences. Comparing the data shown in FIG. 3, Example 1 and Example 2 have significant differences, it can be seen that Example 3 of the present disclosure has better capability to overcome the inevitable process variations while mass production of LCD panels. Hence, the effect of the optical transmittance loss caused by process variation can be weakened by controlling the design of the electrode spacing of a FFS mode LCD panel. That is, Example 3 possesses much more tolerance for process variation than Example 1 does. Therefore, a better design of the electrode spacing is effective to elevate the yield of a FFS mode LCD panel. Wherein the electrode design of the pixel area PA, the film-stacking structure, d1, and d2 are defined the same as above, only the reference numeral of them are different from above-mentioned, such as: common electrode CE, first common electrode 509, second common electrode 510, pixel electrode 507, data line 505, and insulating layer 508.

Embodiment 2

Except the design of the electrode spacing of a FFS mode LCD panel, the properties of the liquid crystal material, such as the dielectric anisotropy (Δ∈), birefringence (Δn), and the thickness of the liquid crystal layer (or namely cell gap between first and second substrates, D) of the FFS mode LCD panel are also key factors to change the optical transmittance and the optical transmittance loss at different locations within the pixel area (uniformity). Wherein the dielectric anisotropy (Δ∈) is the dielectric constant difference between the dielectric constant of liquid crystal molecular in two axis direction, such as the dielectric constant in the parallel direction (∈∥) and the dielectric constant (∈⊥) in the vertical direction, and means the Δ∈ equal to (∈∥ minus ∈⊥, or namely ∈∥−∈⊥), wherein the liquid crystal molecular has long axis and short axis. The liquid crystal materials which have Δ∈ is substantially greater than zero is called positive-type liquid crystal. If the applied voltage greater than a certain degree (or namely critical voltage), long axis of the liquid crystal molecular of the positive-type liquid crystal molecules are substantially arranged in parallel to the electric field direction; In contrary, the liquid crystal materials which have Δ∈ is substantially lower than zero is called a negative-type liquid crystal. If the applied voltage is greater than a certain degree (or namely critical voltage), long axis of the liquid crystal molecular of the negative-type liquid crystal molecules are substantially arranged vertical to the electric field direction. It must be noted that, when a liquid crystal material has Δ∈<0 (a negative-type liquid crystal) and is taken the absolute value to be positive, such a liquid crystal material is still a negative-type liquid crystal. It cannot be regarded as a positive-type liquid crystal, and also not used in the present embodiment. The birefringence (or namely birefringence coefficient, Δn) of a liquid crystal material is the difference between the refractive index of the liquid crystal material towards to the extraordinary ray (ne) and the refractive index of the liquid crystal material towards to the ordinary ray (no). The ordinary ray (light) refers to the light which enters a liquid crystal material with a vibration direction of the electric field of the light vertical to the optical axis of the liquid crystal material; and the extraordinary ray refers to light which enters a liquid crystal material with a vibration direction of the electric field of the light in parallel to the optical axis of the liquid crystal material. The refractive index of a liquid crystal material towards to the ordinary ray is generally defined as "no"; and the refractive index of a liquid crystal material towards to the extraordinary ray is generally defined as "ne". Therefore, "no" is substantially equal to n⊥, and "ne" is substantially equal to n∥. Birefringences (or namely delta n, Δn) is substantially equal to (ne minus no) and also substantially equal to n∥ minus n⊥ (or namely Δn=(ne−no)=(n∥−n⊥)). The selection of different liquid crystal material with different birefringences (Δn) will affect the optical transmittance of the incident light.

Figure 6:
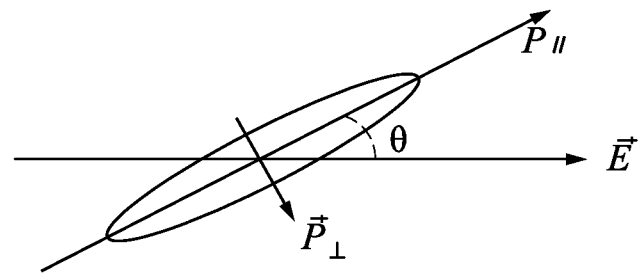
FIG. 6 illustrates how $\Delta \in$ of liquid crystal material affected by electric field.

As shown in FIG. 6, the liquid crystal molecules in a vector electric field $\vec{E}$ forms a vector electric dipole $\vec{P}$, and $\vec{P}$ is substantially equal to dot product of ∈ and $\vec{E}$ ($\vec{P}=\in\cdot\vec{E}$). The vector dipole $\vec{P}$ causes the liquid crystal molecules in uniform electric field E affected by a torque τ, and τ is substantially equal to cross product of E and $\vec{P}$ ($\tau=\vec{P}\times E$). Therefore the degree of the rotation of the liquid crystal molecules in the electric field is determined by the magnitude of the electric field and the dielectric anisotropy (Δ∈) of the liquid crystal molecules, where ∈ is the dielectric constant of a liquid crystal molecule. In the FFS mode LCD panel of the present disclosure, a positive-type (Δ∈>0) liquid crystal is adopted, and the electric field is formed by applying different voltages to the slit-shaped electrode above the insulating layer and the planar-shape electrode below the insulating layer, wherein the planar-shape electrode has not slit. At the edges of the slit-shaped electrode, exists a strongest and vertical electric field, therefore, a positive-type liquid crystal here will tend to arrange in parallel each other and along the vertical directions of the electric field. If the dielectric anisotropy (Δ∈) of the liquid crystal molecules is larger, the arrangement of the liquid crystal molecules in this direction is more likely to be vertical. According to the formula of the optical transmittance (T) of the light: T=(½)·sin² (2φ)sin² π·(Δnd/λ), wherein λ is the wavelength of visible light. The rotation angle φ of liquid crystal molecules in the horizontal direction affect the polarization of the light, so that increases or decreases the optical transmittance. Therefore, if the arrangement of the liquid crystal molecules, which are near the slit-shaped electrode, is closer to be vertical, the rotation angel in horizontal direction of the liquid crystal molecules is also smaller. That is, if adopted the liquid crystal with greater dielectric anisotropy (Δ∈), the optical transmittance of the FFS mode LCD panel will be reduced. According to the formula of the optical transmittance of the light, the birefringence (Δn) of the liquid crystal molecules and the thickness D of the liquid crystal layer also affect the optical transmittance of the FFS mode LCD panels.

The structure of FSS mode LCD panel of the present disclosure is shown in FIG. 1, FIG. 1A, and FIG. 1B as aforementioned Embodiment 1. The structure comprises a first substrate 101, a second substrate 102, and a liquid crystal layer 103 disposed between the first substrate 101 and the second substrate 102; at least one scan line 104 disposed on the first substrate 101; at least one data line 105 disposed on the first substrate 101, and the data line 105 crossing the scan line 104 to define at least one pixel area PA; at least one switch 106 disposed in the pixel area PA, the switch 106 being electrically connected to the scan line 104, the data line 105, and at least one pixel electrode 107, respectively, wherein the pixel electrode 107 is disposed in the pixel areas PA; and at least one common electrode CE disposed on the pixel area PA of the first substrate 101, and the common electrode CE being separated by a insulating layer 108 between the pixel electrode 107 and the common electrode CE, wherein the common electrode CE at least comprises a plurality of first common electrode 109 and at least one second common electrode 110, the second common electrode 110 disposed and covering the data line 105. There is a space S between every two adjacent first common electrode 109, and the plurality of first common electrode 109 is disposed in the pixel area PA. Wherein, the liquid crystal layer 103 has a predetermined thickness (D) and a liquid crystal materials, the liquid crystal material of the liquid crystal layer 103 has birefringence (or namely birefringence coefficient, Δn). The liquid crystal material of the liquid crystal layer 103 has positive dielectric anisotropy (Δ∈). In general, Δn is approximately less than 1, but substantially greater than zero. Generally, Δn is approximately less than 0.5, but substantially greater than 0. Preferably, Δn is approximately less than 1, but approximately greater than 0.5. More preferably, Δn is approximately less than 0.5, but approximately greater than 0.3. Most preferably, Δn is approximately less than 0.3, but approximately greater than 0.1. In the present embodiment, Δn approximately equals to 0.1 as the most preferred embodiment, but is not limited thereto. And the thickness of the liquid crystal layer ranges from about 1 μm to about 5 μm as an example, but is not limited thereto.

In the present disclosure, the impact of the optical transmittance of the LCD panel caused by the above-described liquid crystal parameters is evaluated, especially to the parameters such as the positive-type dielectric anisotropy (Δ∈) of the liquid crystal materials of the liquid crystal layer, the predetermined thickness (D) of the liquid crystal layer, the birefringence (Δn) of the liquid crystal materials of the liquid crystal layer, and the product (Δn*D) of the birefringence (Δn) and the predetermined thickness (D). The LCD panels as the following examples are fabricated by selecting Δ∈ ranges from about 5 to about 10, and Δn*D ranges from about 340 nm to about 391 nm (except Δ∈ and Δn*D, the rest parameters of the LCD panels are the same as those of above Example 1). The losses of optical transmittance (%) of the following examples caused by the same process variation are summarized in the Table 4 and FIG. 7 below (the degree of the process variation is the same as Example 2 to Example 1):

TABLE 4

The optical transmittance loss data caused by the same degree of process variation in different parameters(Δε and Δn*D) of the liquid crystal layer
Optical transmittance loss %

| Δn*D (nm) | positive dielectric anisotropy, Δε | | | | | |
|---|---|---|---|---|---|---|
| | 5 | 6 | 7 | 8 | 9 | 10 |
| 391 | 7.41% | 7.43% | 7.80% | 7.90% | 8.20% | 8.40% |
| 374 | 7.70% | 7.70% | 8.10% | 8.20% | 8.60% | 8.70% |
| 357 | 7.90% | 8.00% | 8.40% | 8.50% | 8.80% | 8.90% |
| 340 | 8.10% | 8.20% | 8.60% | 8.70% | 9.00% | 9.21% |

Comparing to the LCD panels with predetermined electrode spacing, each the LCD panels suffered the same degree of process variations has electric field intensity distribution deviated from their predetermined design respectively, so as to resulting in the loss of the optical transmittance, however, when facing the same degree of process variation, the extent of loss of the optical transmittance of different designs is different from each other.

Figure 7:
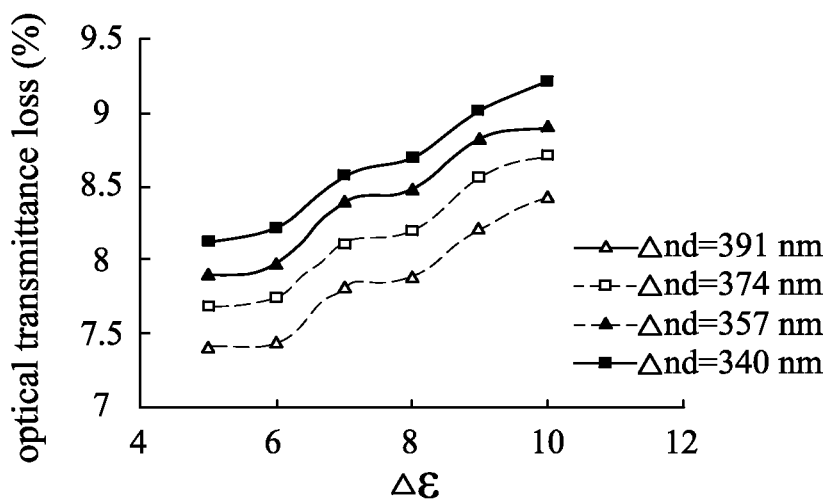
FIG. 7 is the results of optical transmittance loss in different parameters of liquid crystal material of the liquid crystal layer of the present disclosure.

As shown in Table 4 and FIG. 7, an obvious trend is observed within (Δn*D) ranges from about 340 to about 391 nm. When (Δn*D) increases, the loss of the optical transmittance of the LCD panel caused by process variation will be obviously improved; Meanwhile, an obvious trend is also observed within Δ∈ ranges from about 5 to about 10. When Δ∈ decreases, the loss of the optical transmittance of the LCD panel caused by process variation will also be obviously improved. Furthermore, the LCD panel with (Δn*D) substantially equal to 391, and Δ∈ is substantially equal to 5 is selected as Example 5. It should be noticed that the optical transmittance loss of Example 5 caused by process variation is substantially reduced to 7.41% (as shown in Table 4 and FIG. 7). By the same degree of process variation from above Example 1 to Example 2, produce the LCD panel Example 6 from Example 5.

The parameters of the liquid crystal layer of Examples 5, 6 and Examples 1, 2 are summarized and shown in Table 5, wherein Example 1, 5 is the baseline (standard) of their LCD panel suffered process variation, Example 2, 6, respectively. Therefore, the optical transmittance losses of Example 1, 5 are defined as 0 (zero) respectively.

In other words, Example 1 in Table 5 is the LCD panel with predetermined electrode spacing design without suffering process variation (d1 is about 4 μm, d2 is about 2 μm), and its Δ∈ is about 7, (Δn*D) is about 340 nm; Example 2 in Table 5 is the LCD panel suffered process variation with deviated electrode spacing (d1 is about 2.45 μm, d2 is about 2.45 μm), and its Δ∈ is about 7, (Δn*D) is about 340 nm; Example 5 in Table 5 is the LCD panel with predetermined electrode spacing design without suffering process variation (d1 is about 4 μm, d2 is about 2 μm), and its Δ∈ is about 5, (Δn*D) is about 391 nm; and Example 6 in Table 5 is the LCD panel suffered process variation with deviated electrode spacing (d1 is about 2.45 µm, d2 is about 2.45 µm), and its $\Delta\in$ is about 5, ($\Delta n*D$) is about 391 nm.

TABLE 5

The optical transmittance loss data caused by the same degree of process variation in different liquid crystal materials design of the liquid crystal layer

| | $\Delta\epsilon$ | $\Delta n * D$ (µm) | The optical transmittance loss data caused by the same degree of process variation (%) |
|---|---|---|---|
| Example 1 | 7 | 340 | 0 |
| Example 2 | 7 | 340 | 8.60 |
| Example 5 | 5 | 391 | 0 |
| Example 6 | 5 | 391 | 7.41 |

As shown in Table 5, the optical transmittance loss of Example 5 of the present disclosure has been significantly decreased comparing to that of Example 1. Under the same degree of process variation occurred to Example 1 and Example 5, the optical transmittance loss of Example 2 (compared to its original design Example 1) is 8.60%, but that of Example 6 (compared to its original design Example 5) is 7.41%. The optical transmittance loss decreases from about 8.60% to about 7.41% by changing the design of the liquid crystal layer. Therefore, the different design of the liquid crystal layer of the LCD panels would lead to different performance of optical transmittance loss when suffered the same degree of process variation. Therefore, the effect of the optical transmittance loss caused by process variation can be tunable by selecting different $\Delta\in$ and ($\Delta n*D$) of the liquid crystal layer of a FFS mode LCD panel. Accordingly, combination of lower $\Delta\in$ (about 5) and higher ($\Delta n*D$) (about 391 nm) is preferable to weaken the optical transmittance loss caused by process variation. That is, Example 5 possesses much more tolerance for process variation than Example 1 does. Therefore, a better design of the liquid crystal layer ($\Delta\in$ and $\Delta n$ of liquid crystal material; thickness D of the liquid crystal layer) is effective to elevate the yield of a FFS mode LCD panel.

Furthermore, Example 7 is fabricated by combining aforementioned electrode spacing parameters of Examples 3 and the design of the liquid crystal layer of Example 5. And Example 8 is also produced by the degree of process variation from Example 7, which the degree of process variation is the same as Example 1 to Example 2. Wherein the electrode design of the pixel area PA, the film-stacking structure, d1, and d2 are defined the same as above, only the reference numeral of them are different from above-mentioned, such as common electrode CE, first common electrode 809, second common electrode 810, pixel electrode 807, data line 805, and insulating layer 808.

The parameters of the liquid crystal layer of Examples 7, 8 and Examples 1, 2 are summarized and shown in Table 6, wherein Example 1, 7 is the baseline of their LCD panel suffered process variation, Example 2, 8, respectively. Therefore, the optical transmittance losses of Example 1, 7 are defined as 0 (zero) respectively.

In other words, Example 1 in Table 6 is the LCD panel with predetermined electrode spacing design without suffering process variation (d1 is about 4 µm, d2 is about 2 µm), and its $\Delta\in$ is about 7, ($\Delta n*D$) is about 340 nm; Example 2 in Table 6 is Example 1 suffered process variation with deviated electrode spacing (d1 is about 2.45 µm, d2 is about 2.45 µm), and its $\Delta\in$ is about 7, ($\Delta n*D$) is about 340 nm; Example 7 in Table 6 is the LCD panel with predetermined electrode spacing design without suffering process variation (d1 is about 7 µm, d2 is about 0 µm), and its $\Delta\in$ is about 5, ($\Delta n*D$) is about 391 nm; and Example 8 in Table 6 is Example 7 suffered process variation with deviated electrode spacing (d1 is about 5.45 µm, d2 is about 0.45 µm), and its $\Delta\in$ is about 5, ($\Delta n*D$) is about 391 nm.

TABLE 6

The optical transmittance loss data caused by the same degree of process variation in different electrode spacing design and liquid crystal materials design of the liquid crystal layer

| | d1 (µm) | d2 (µm) | d1 + d2 (µm) | $\Delta\epsilon$ | $\Delta n d$ (µm) | The optical transmittance loss data caused by the same degree of process variation (%) |
|---|---|---|---|---|---|---|
| Example 1 | 4 | 2 | 6 | 7 | 340 | 0 |
| Example 2 | 2.45 | 2.45 | 4.9 | 7 | 340 | 8.60 |
| Example 7 | 7 | 0 | 7 | 5 | 391 | 0 |
| Example 8 | 5.45 | 0.45 | 5.9 | 5 | 391 | 0.61 |

Figure 8:
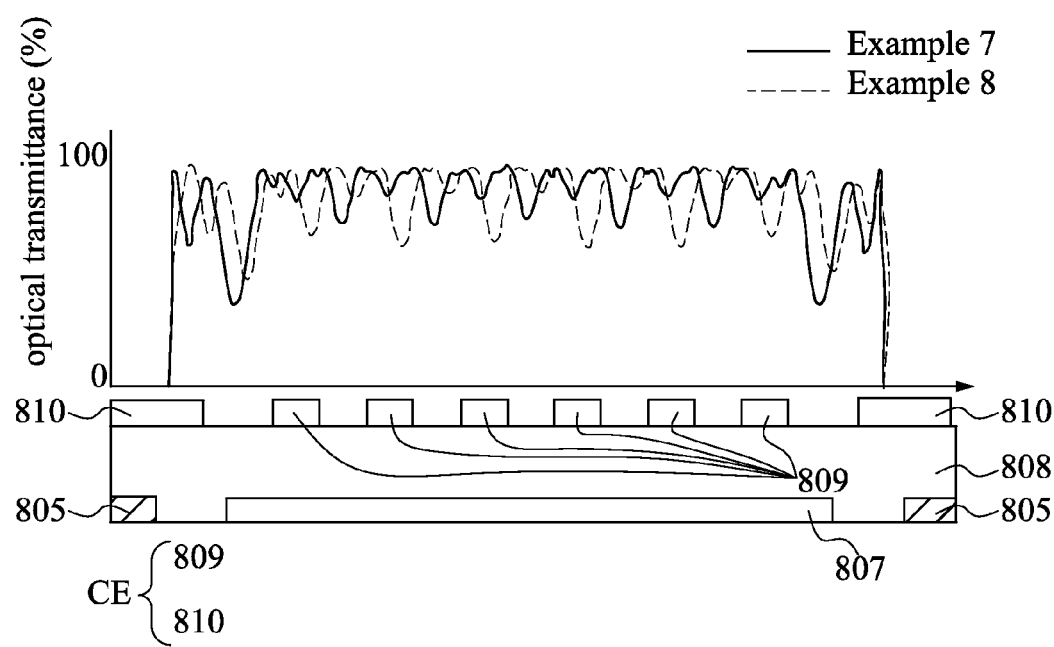
FIG. 8 is the results of the transmittance uniformity (within one pixel area) of Example 7 and Example 8 of the present disclosure.

As shown in Table 6, the optical transmittance loss of Example 8 of the present disclosure has been significantly decreased comparing to that of Example 2. Under the same degree of process variation occurred to Example 1 and Example 7, the optical transmittance loss of Example 2 (compared to its original design Example 1) is 8.60%, but that of Example 8 (compared to its original design Example 7) is 0.61%. The optical transmittance loss decreases from 8.60% to 0.61% by changing the design of the liquid crystal layer and electrode spacing. Therefore, the different design of the liquid crystal layer and electrode spacing of the LCD panels would lead to different performance of optical transmittance loss when suffered the same degree of process variation. That is, the effect of the optical transmittance loss caused by process variation can be tunable by selecting different d1, d2, $\Delta\in$, and ($\Delta n*D$) of a FFS mode LCD panel. In addition, as shown in FIG. 8, FIG. 8 is the cross-sectional view of the optical transmittance (%) within a single pixel area PA in horizontal direction (as the BB' sectional line of FIG. 1); curve of Example 7 represents the display panel which is not suffered the process variations, and the electrode distances of the display panel of Example 7, d1 and d2, are in accordance with a predetermined design; curve of Example 8 represents the display panel which is suffered the process variations, and the electrode distances of the display panel of Example 8, d1 and d2, are different from the predetermined design. The differences between Example 7 and 8 in the loss of the average optical transmittance and optical transmittance loss at different locations (uniformity) are not as significant as those of Example 7 and 2 (in FIG. 3). Comparing the data shown in FIG. 3, it can seen that Example 7 of the present disclosure has better capability to overcome the inevitable process variations while mass production of LCD panels. Hence, controlling the design of the electrode spacing/the liquid crystal layer of a FFS mode LCD panel can weaken the effect of the optical transmittance loss caused by process variation. That is, Example 7 possesses much more tolerance for process variation than Example 1 does. Therefore, a better design of the electrode spacing and the liquid crystal layer are effective to elevate the yield of a FFS mode LCD panel.

Finally, it should be emphasized that the pixel structure of the FFS mode LCD panel of the present disclosure is top common design. To be more specific, the common electrodes are disposed above the pixel electrodes (see FIGS. 1, 1A and 1B) of the present disclosure. This is quite different from top pixel design (the common electrodes are disposed below the pixel electrodes). Moreover, common electrodes of the present disclosure are also disposed on the data line (as shown in FIG. 9B).

Figure 9:
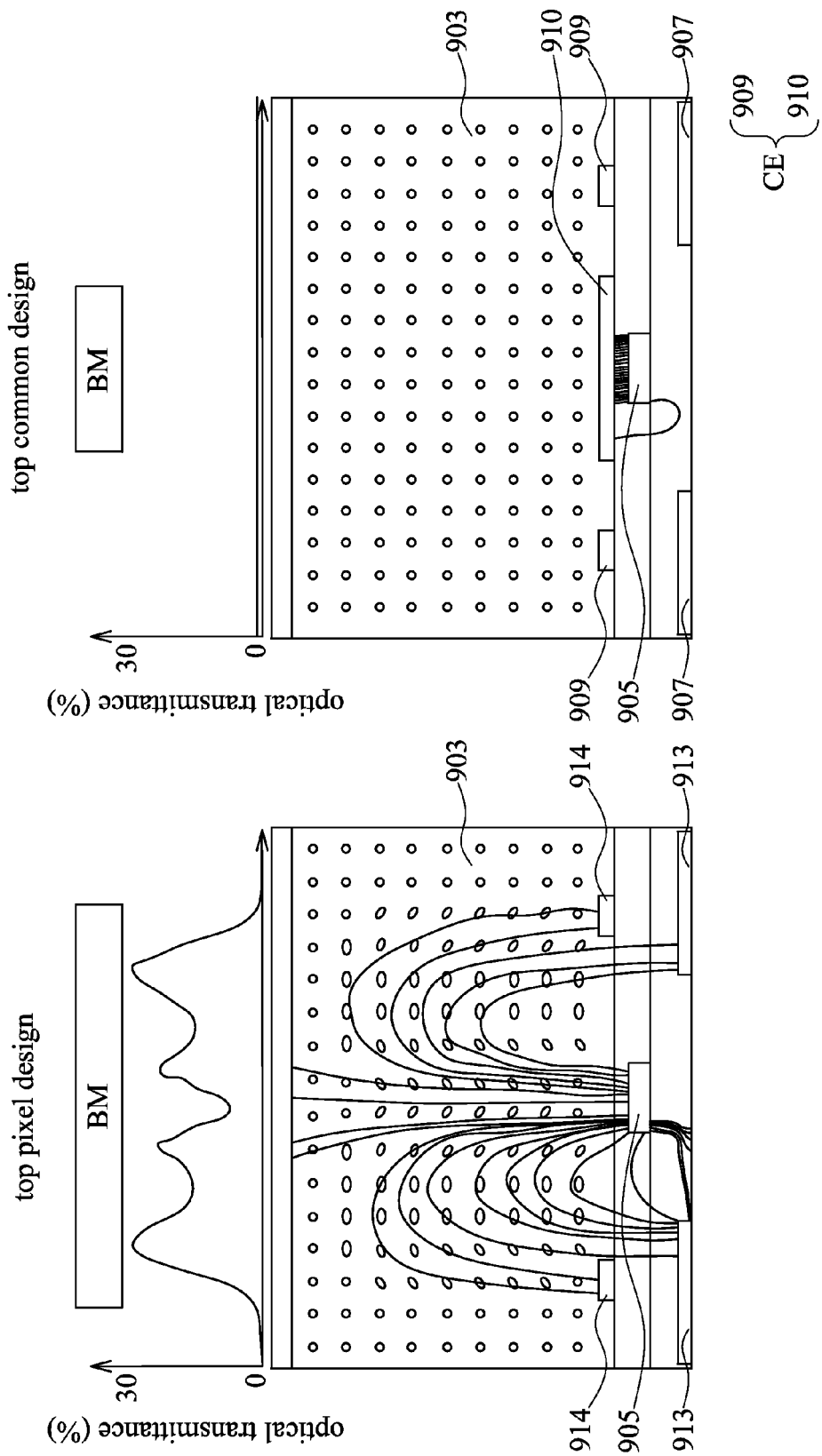
FIG. 9A illustrates top pixel design (the majority of FFS mode LCD panel on market adopted)
FIG. 9B illustrates top common design of the present disclosure.

The both design of the pixel structure (top common design and top pixel design) are illustrated and compared in FIG. 9A, 9B. FIG. 9A illustrates top pixel design. As shown in FIG. 9A, the pixel electrodes 914 are disposed above the data line 905, and the common electrodes 913 are disposed below the data line 905 and are corresponded to the pixel electrodes 914. Wherein the data line 905 in top pixel design is not covered by the pixel electrodes 914 and also not covered by the common electrodes 913. However, FIG. 9B illustrates top common design in the present disclosure. As shown in FIG. 9B, the common electrode CE of the present disclosure comprises first common electrodes 909 and at least one second common electrode 910. First common electrodes 909 and the second common electrode 910 are disposed above data line 905 and pixel electrode 907, and the second common electrode 910 is disposed in the position corresponding data line 905 and covering data line 905. The pixel electrode 907 is under the common electrode CE in FIG. 9B. These differences in pixel structure of top pixel design (FIG. 9A) and that of top common design (FIG. 9B) would lead to totally different distribution of electric field in pixel area. As shown in both FIGS. 9A and 9B, the rotation of liquid crystal molecules of the liquid crystal layer 903 is controlled by the distribution of electric field.

Figure 10:
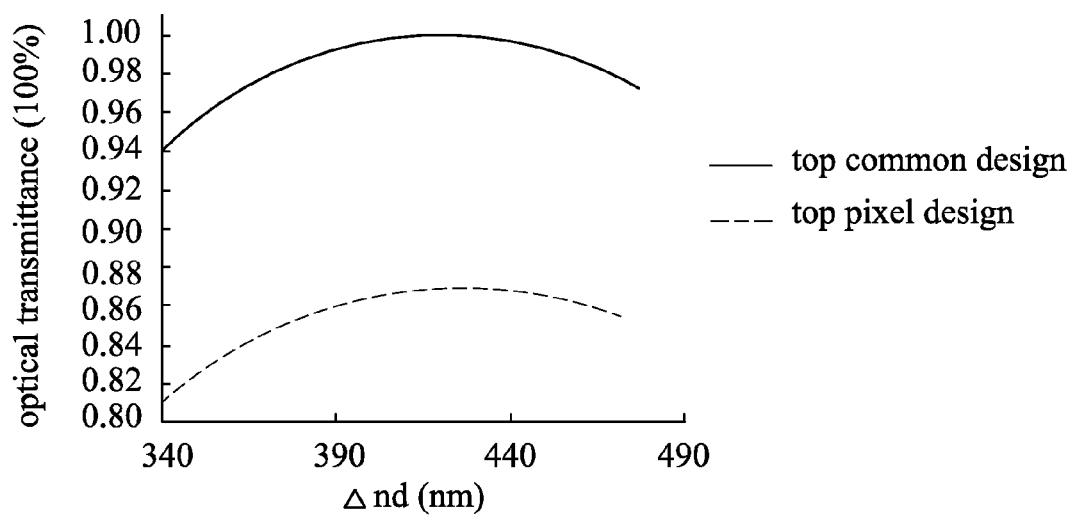
FIG. 10 is the comparison of top pixel design and top common design (the present disclosure).

As shown in FIGS. 9A and 9B, even when a pixel area is predetermined to be dark state, the data line 905 in both top pixel design (FIG. 9A) and top common design (FIG. 9B) possesses a voltage to offer other pixel areas adjacent to the pixel area. The voltage of the data line 905 generates an electric field around the data line 905. In the present disclosure (top common design), as shown in FIG. 9B, the electric field would be shield by the second common electrode 910 of the common electrode CE, and the rotation of the liquid crystal molecules of the liquid crystal layer 903 would not be affected by the electric field. However, in top pixel design (pixel electrode 914 is above common electrode 913, see FIG. 9A), the rotation of the liquid crystal molecules of the liquid crystal layer 903 would be affected by the electric field from the first substrate via liquid crystal layer 903 to the second substrate (as shown in FIG. 9A) and cause light leakage while the pixel area along the horizontal directional is predetermined in dark state. To solve this issue, a wider light-shielding layer (black matrix, BM) is frequently applied in top pixel design (pixel electrode 914 is above common electrode 913, FIG. 9A) to cover the pixel electrode 914 and common electrode 913, which is near data line 905. It results in the aperture ratio of the pixel area of top pixel design is smaller than that of top common design (common electrode CE is above pixel electrode 907 as the present disclosure, see FIG. 9B). That is, the light-shielding layer (black matrix, BM) of the present disclosure is not necessary to cover the pixel electrode 907, which is near the data line 905. In other words, the light-shielding layer (black matrix, BM) of the present disclosure is not as wide as that of top pixel design. Hence, as shown in FIG. 10, the aperture ratios of top pixel design (pixel electrode 914 is above common electrode 913, FIG. 9A) are smaller than those of top common design (common electrode CE is above pixel electrode 907 as the present disclosure, FIG. 9B) in the same range of ($\Delta n*D$).

It is very important that the electric fields formed by the top common design are totally different from that of top pixel design (as described above, FIG. 9A and FIG. 9B). Therefore, the parameters of all Examples disclosed in the present disclosure can not be applied to the pixel area in top pixel design, and vice versa.

In summary, the optical transmittance loss caused by process variation is improved by the optimized design of electrode spacing in the FFS mode LCD panel of the present disclosure. In addition, the optical transmittance loss caused by process variation is further improved by further selecting specific $\Delta\epsilon$, and $\Delta n$ of the liquid crystal materials of the liquid crystal layer (collocated with or combined with predetermined thickness of the liquid crystal layer, D). Accordingly, when facing inevitable process variations and causing the electrode spacing of actually produced FFS mode LCD panel is different from that of predetermined design, the FFS mode LCD panel of the present disclosure still keeps good optical transmittance in average and good uniformity of optical transmittance within pixel area. Therefore, the yield of producing the FFS mode LCD panel of the present disclosure is significantly improved. Besides, further combining specific $\Delta\epsilon$, and $\Delta n$ of the liquid crystal materials of the liquid crystal layer (collocated with predetermined thickness of the liquid crystal layer, D) with the optimized design of electrode spacing can further improve the loss of optical transmittance (refer to the aforementioned Examples).

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

What is claimed is:

1. A fringe-field switching (FFS) mode liquid crystal display (LCD) panel, comprising:
    a first substrate, a second substrate, and a liquid crystal layer disposed between the first substrate and the second substrate;
    at least one scan line disposed on the first substrate;
    at least one data line disposed on the first substrate, and crossing the scan line to define at least one pixel area;
    at least one switch disposed in the pixel area and electrically connected to the scan line, the data line, and at least one pixel electrode, respectively, wherein the pixel electrode is disposed in the pixel area; and
    at least one common electrode disposed on the pixel area of the first substrate, and being separated from the pixel electrode by a insulating layer, wherein the common electrode at least comprises a plurality of first common electrodes and at least one second common electrode, the second common electrode is disposed above the data line and covering the data line, and the first common electrodes are disposed in the pixel area where there is a space between every two adjacent first common electrodes, wherein the projection distance on the first substrate between the edge of the pixel electrode of the pixel area and the edge of the first common electrode, which is nearest to the second common electrode, is d1, the projection distance on the first substrate between the edge of the second common electrode and the edge of the pixel electrode of the pixel area is d2, wherein sum of (d1+d2) ranges from about 5 um to about 7 μm, and d1 is greater than d2.

2. The FFS mode LCD panel of claim 1, wherein d2 ranges from about 0 um to about 2 μm.

3. The FFS mode LCD panel of claim 1, wherein the sum of (d1+d2) is about 7 μm, and d2 is about 0 μm.

4. The FFS mode LCD panel of claim 1, wherein the width of the second common electrode is greater than the width of the data line.

5. The FFS mode LCD panel of claim 1, wherein the width of the second common electrode is greater than the width of each first common electrodes.

6. The FFS mode LCD panel of claim 1, wherein the liquid crystal layer has a predetermined thickness (D) and liquid crystal materials, wherein the product of the predetermined thickness (D) of the liquid crystal layer and the birefringence ($\Delta n$) of the liquid crystal materials of the liquid crystal layer ($\Delta n*D$) ranges from about 340 nm to about 391 nm, and the liquid crystal materials of the liquid crystal layer has positive dielectric anisotropy ($\Delta \in$) being range from about 5 to 10.

7. The FFS mode LCD panel of claim 1, wherein the liquid crystal layer has a predetermined thickness (D) and a liquid crystal materials, wherein the product of the predetermined thickness (D) of the liquid crystal layer and the birefringence ($\Delta n$) of the liquid crystal materials of the liquid crystal layer ($\Delta n*D$) is substantially equal to 391 nm, and the liquid crystal materials of the liquid crystal layer has positive dielectric anisotropy ($\Delta \in$) being substantially equal to 5.

\* \* \* \* \*